Dec. 21, 1926.
E. A. SPERRY
1,611,253
SPEED MEASURING DEVICE
Filed Dec. 12, 1918
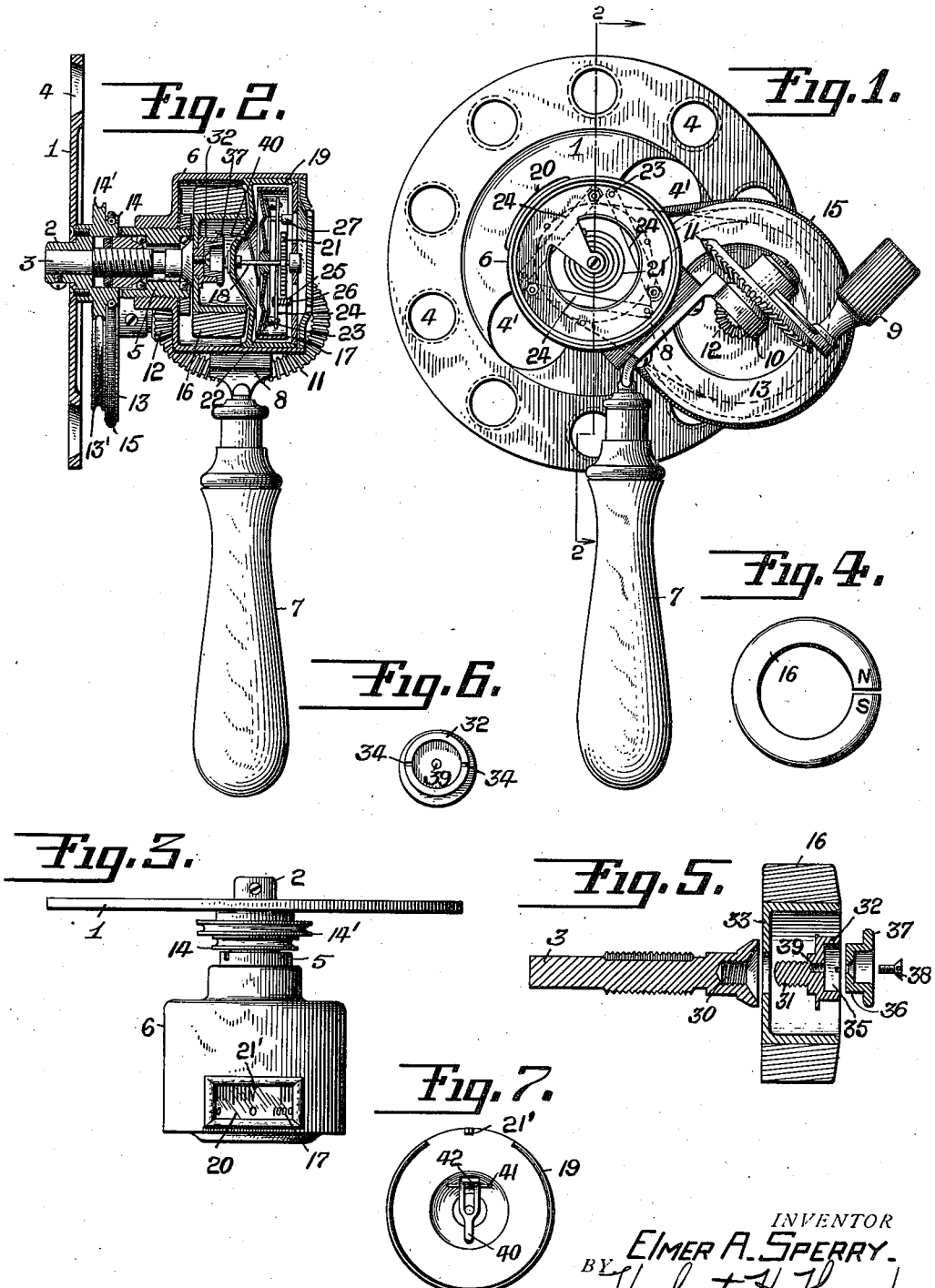
INVENTOR
Elmer A. Sperry.
BY Herbert H. Thompson
his ATTORNEY

Patented Dec. 21, 1926.

1,611,253

UNITED STATES PATENT OFFICE.

ELMER A. SPERRY, OF BROOKLYN, NEW YORK.

SPEED-MEASURING DEVICE.

Application filed December 12, 1918. Serial No. 266,369.

This invention relates to means for determining the speed of a rotating body. More specifically the invention relates to stroboscopic apparatus for determining such speed.

In my United States Patent 1,071,815—"Apparatus for determination of periodic motion"—granted September 2nd, 1913, I disclosed a stroboscope for determining the speed of rotation of an object. The present invention has for an object to effect certain improvements in the apparatus therein disclosed as well as all apparatus of similar nature.

One of the principal objects of the present invention is to provide a portable hand-driven device, of the character mentioned.

Another object is to provide means whereby sudden changes in speed of the vision interrupting device are prevented.

A further object is to provide means for preventing vibration or hunting of the indicating element. Further objects and advantages will appear as the invention is hereinafter developed.

Referring to the drawings which illustrate what I now consider a preferrred form of my invention:

Fig. 1 is a rear elevation of one form of hand driven stroboscope.

Fig. 2 is a section taken on the line 2—2 of Fig. 1.

Fig. 3 is a plan view of the device shown in Fig. 1, certain parts being omitted.

Fig. 4 is a detail elevation of the magnet forming a part of the tachometer.

Fig. 5 is a detail section of certain of the parts shown in Fig. 2.

Figs. 6 and 7 are detail elevations of certain of the parts shown in Figs. 2 and 5.

My invention embodies a vision interrupting device, means for driving the same, and a tachometer, or other speed indicating device, operatively connected to the vision interrupting device so as to give a reading of the speed of a rotating object when a marking on the latter is sighted through the interrupter and appears to stand still. Thus in Figs. 1, 2, and 3 I have shown vision interrupting means in the form of a disc 1 mounted on a hub 2 secured to a shaft 3. The disc is provided with a circular series of equi-angularly spaced apertures 4 through which the rotating object, of which the speed is to be measured, may be viewed. The shaft 3 is shown journalled in the ball bearing 5, screwed into or otherwise secured to a housing 6 which may be held and carried by means of a handle 7 secured to a bracket 8 in turn secured to said housing 6. Various means for rotating the disc 1 may be employed but at present I prefer to employ a crank, or other manually operable member 9 journalled at 10 in the bracket 8, and suitable gearing between said crank and disc.

In the operation of the instrument it is extremely important that sudden changes in speed of the vision interrupting means be prevented as otherwise the point at which the object under observation appears to be stationary may be passed by rapidly and without being noticed by the operator, especially if the latter is unskilled. When power means are used to rotate said means, little difficulty of this nature is encountered. But, when the attempt is made to rotate said means by hand, it is impossible to maintain a steady speed unless means are employed for this purpose. Various means may be provided for preventing such sudden changes in speed among which are the following which may be employed either singly or conjointly. Rotating parts of comparatively high moments of inertia may be provided, speed multiplying means may be employed between the crank 9 and disc 1, a yielding or elastic connection may be provided between said crank and disc, or a magnetic or other drag may be imposed on the disc. In the present illustration I have embodied means including all of these expedients as will hereinafter more specifically appear.

The shaft of the crank 9 has secured thereto a beveled gear 11 which meshes with a smaller gear 12 secured to a comparatively large pulley 13 journalled for rotation on the bracket 8. The pulley 13 is adapted to drive a smaller pulley 14, secured to the hub 2, through an elastic belt 15 shown in the form of a helix of elastic wire. The rim of the disc 1 is preferably made comparatively heavy so that said disc constitutes in effect a fly-wheel, i. e. a member having a considerable moment of inertia. By virtue of this moment of inertia of the disc, the yielding connection 15 and the step-up gearing it will be seen that abrupt changes in speed of said disc will be effectively prevented even though an attempt is made to jerk or suddenly to stop the crank 9.

While various forms of tachometers, or speed indicating devices, may be employed in connection with the vision interrupter I prefer to employ one of the magnetic-drag type, for by employing this type, a magnetic-drag is imposed on the shaft 3 giving it greater steadiness and the moment of inertia of the system secured to the latter is also greatly enhanced by the rotating magnetic element. While the specific details of the tachometer per se form no part of the present invention, which resides rather in the combination hereinafter claimed, said tachometer may be described briefly as follows:

A permanent magnet, in the form of a comparatively heavy split torus 16 (see Fig. 4), is secured to the shaft 3. A metal non-magnetic cup-shaped member 17 is secured to a shaft 18 journalled in a housing 19 secured within and to the main housing 6. The periphery of the member 17 is provided with a scale adapted to be read, in conjunction with a fixed pointer 21', through a window 20 provided in the casing 6. A spiral spring 21 is secured to the housing 19 and to the shaft 18 in order to bias the indicator to zero position. A ring or annulus 22 of magnetic material is secured to housing 19 on the side of member 17 opposite the magnet 16 so that a certain amount of magnetic flux from the latter leaks through said member 17 and into said ring 22. As changes in temperature vary the tension of the spring 21 and the resistance of member 17, the ring 22 is so mounted as to be automatically moved toward or away from the magnet 16 and member 17 in accordance with the temperature so as to compensate for the variations above referred to, in order to keep the readings correct. For this purpose the said ring 17 carries a plurality of posts 23 each of which has secured thereto one end of a corresponding one of a plurality of bimetallic strips 24. The other ends of the latter are loosely mounted on standards 25, secured to casing 19, compression springs 26 being mounted on said standards 25 between the housing 19 and strips 24. A plurality of telescoping guide standards 27 are also connected to the ring 22 and housing 19.

It will be understood by those skilled in the art that if the disc 1 is rotated at such a speed that a rotating object, sighted therethrough, appears to be stationary and if the tachometer is calibrated to give the speed of the interruption of vision by member 1, the scale will indicate the speed of rotation of the object under observation.

Under certain conditions it may be desirable to obtain the speed of an object, which is rotating at a comparatively low speed, with greater accuracy than is possible with the above described system. This may be effected by various means as, for example, by providing additional series of apertures 4' inside the series 4. By providing such a number of apertures 4 in the inner series that the number in the outer series is a multiple thereof the inner series may be utilized simply by dividing the reading of the scale 20 by this multiple. In the specific instrument illustrated, if the outer series of apertures is utilized a direct reading may be obtained from the scale 20 while the inner series of apertures is employed the scale reading should be divided by five as there are five times as many apertures in the outer series as there are in the inner.

If desirable a set of pulleys 13', 14' may be provided in addition to the pulleys 13, 14, the pulley 13' being smaller than pulley 13 and the pulley 14' correspondingly larger than pulley 14. The belt 15 may be transferred from either set of pulleys to the other so that when an object rotating at a high speed is under observation the pulleys 13, 14 may be employed while if an object rotating at a lower speed is under observation the other set, 13', 14' may be employed. The operation of the instrument is thereby greatly facilitated.

In the use of the instrument it is obviously necessary from a practical standpoint to read the scale 20 exactly at the time at which the object under observation appears stationary. It is extremely important, therefore, that vibration or hunting of the said scale be prevented and that the scale give an accurate definite reading at all times. To insure this I provide an intermittently, automatically operating brake or stop means for the member 17. One form of such means is illustrated in Figs. 2, 5, 6, and 7 and may be constructed substantially as follows.

The shaft 3 is tapped at 30 to receive the screw-threaded extension 31 of a member 32 between which member and shaft the non-magnetic suppporting ring 33 of the magnet 16 is gripped. Said member 32 may be provided with slots 34, into which a tool may be inserted for turning the same, and with an eccentric bore 35 adapted to receive a cylindrical member 36 provided with a flange 37; the said flange being thus eccentric with respect to the axis of shaft 3. The member 36 may be secured to member 32 by means of a screw 38 adapted to pass through the former into a tapped opening 39 in the latter. The stop or brake proper is shown in the form of a somewhat resilient bell-crank 40 pivoted at 41 on the casing 19, through which is extends, and biased to engagement with member 17 by means of a spring 42. The outer arm of said bell crank engages the flange 37 so that when the shaft 3 rotates the stop will engage the member 17 once in each revolution of said shaft and will be disengaged from said member during the remaining intervals. It has been found that this form of stop means effectively prevents vibration of the member 17 without impairing its accuracy of indication.

The operation of the instrument should be clear in view of the above specific description. If it is desired to determine the speed of an object the operator rotates the handle 9 and sights through one of the series of apertures in disc 1. When the object appears to stand still the scale 20 is read to obtain the speed. Sudden changes in speed of the disc 1 are prevented, even when actuated by an unskilled operator as is also all vibration or hunting of the movable scale.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:—

1. In a stroboscope, a vision interrupting device, a manually operable member and means comprising an elastic connection operatively connecting said device and member, the degree of elasticity being sufficient to take up such variations as ordinarily occur between said member and said device.

2. A stroboscope comprising a rotatable vision interrupting device having a comparatively high moment of inertia, a manually operable member and means comprising speed-multiplying means and an elastic connection between said member and device.

3. A stroboscopic speed measuring instrument comprising a vision interrupting device, inertia member, a tachometer of the magnetic-drag type, manually operable means including a yielding connection for actuating said device, inertia member and tachometer, and means for damping oscillations of the tachometer indicating element.

4. A speed measuring instrument comprising a vision interrupting device, a tachometer operatively connected thereto, including a plurality of relatively movable members, and means for automatically varying the distance between said members in response to changes of temperature for correcting the reading of the instrument.

5. A stroboscope comprising a vision interrupting device, manually operable means for actuating said device, indicating means connected with said device, and means for preventing changes in temperature from influencing the readings of said indicating means.

6. In a stroboscopic speed measuring instrument, a vision interrupting device, means for rotating said device, means for preventing sudden changes in speed of said device, an indicating element actuated by said device, and means for preventing variations in the indications of said element due to temperature changes.

7. In a stroboscopic speed measuring instrument, a vision interrupting device, means for rotating said device, means for preventing sudden changes in speed of said device, an indicating element actuated by said device, means for preventing variations in the indications of said element due to temperature changes, and means for damping said element.

8. In a stroboscopic speed measuring instrument, a vision interrupting device including a circular series of apertures, and a concentric series of apertures containing a lesser number than said first series, means for rotating said device, and means for measuring the speed of rotation thereof.

9. In a stroboscopic speed measuring instrument, a vision interrupting device including an outer circular series of apertures, and an inner concentric series of apertures, said first series being a multiple of said second series, means for rotating said device, and means for measuring the speed of rotation thereof.

10. In a stroboscopic speed measuring instrument, a vision interrupting device including a member having a large moment of inertia, means for rotating said device including step-up gearing and an elastic driving connection, and indicating means including an element having a large moment of inertia, said member, said gearing, said elastic driving connection and said element operating to prevent sudden variations in the speed of said device.

In testimony whereof I have affixed my signature.

ELMER A. SPERRY.